Dec. 1, 1936.  A. KOWALSKY  2,062,581
STALK GATHERING MEANS FOR CORN BINDERS
Filed Oct. 28, 1935
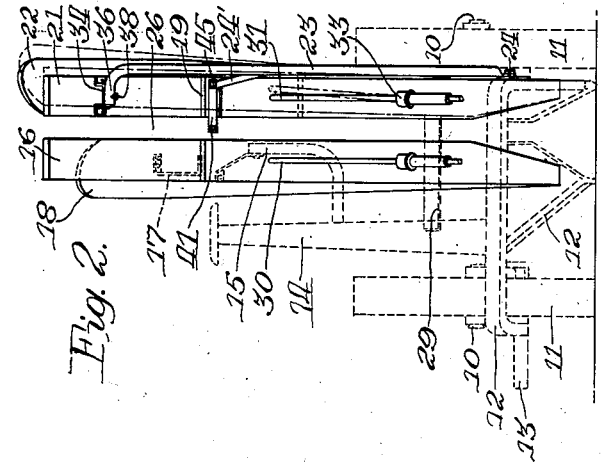
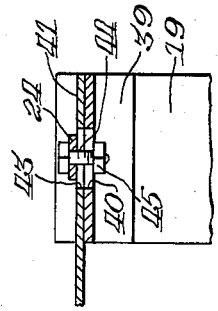
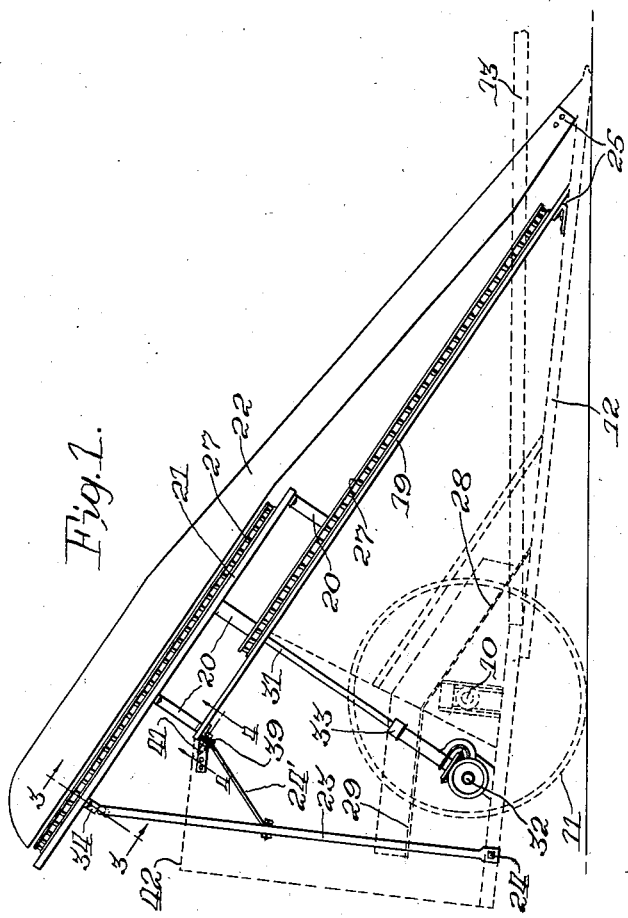
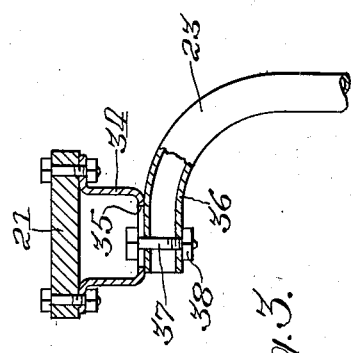
Inventor
Andrew Kowalsky
By /V. Lavasgne
Attys.

Patented Dec. 1, 1936

2,062,581

UNITED STATES PATENT OFFICE 2,062,581

STALK GATHERING MEANS FOR CORN BINDERS

Andrew Kowalsky, Oak Park, Ill., assignor to International Harvester Company, a corporation of New Jersey Application October 28, 1935, Serial No. 47,140

7 Claims. (Cl. 56—119)

The invention relates to corn binders and the like, and particularly to an improved gathering board structure therefor embodying an adjustment for enabling the gathering mechanism to function with greater efficiency when the corn crop being harvested is unusually bushy, or when such crops as soy beans are being handled.

Corn binders have become quite standard in the art and embody crop gathering mechanism, including a pair of upwardly and rearwardly inclined gathering boards, which are spaced apart in normal parallel relation to provide a passage into which a standing row of corn stalks enters to be harvested as the machine moves along a row of corn. Chains engage the stalks entering said passage to hold the stalks erect while they are being cut, said chains then moving the cut stalks to a binding mechanism to be formed into bundles. When the stalk growth is luxuriant and unusually bushy, the narrow passage is severely taxed in handling the crop because of too much crowding. In such crop conditions it is desirable to make the gathering boards relatively adjustable in a lateral direction whereby to widen the stalk gathering passage, better to accommodate the bushy crop and prevent the said objectionable crowding, as well as to prevent the chains from raising the stalks off the butt pan.

Accordingly, the main object of the invention is to provide in a corn binder improved gathering boards which are relatively adjustable in a lateral direction for the purpose of better meeting bushy crop conditions.

Another object is to provide such adjusting means of simple, inexpensive construction, which can be readily applied to standard corn binders without materially changing the construction thereof.

Still another object is to provide means for laterally springing one of the boards relative to the other and to clamp the sprung board in such adjusted position, whereby to widen the crop passage or throat between the boards.

Other objects will become apparent to those skilled in this art as the disclosure is more fully made.

Briefly, in the practicable embodiment of the invention herein chosen for the sake of illustration, the corn binder has the usual two upwardly and rearwardly inclined, spaced gathering board units mounted on the binder frame. The upper rear end of one of the boards is mounted on the frame and clamped by detachable means, permitting said board to be sprung laterally to widen the crop passage space and then to be held securely in such adjusted position.

In the drawing:

Figure 1 is a general side elevational view of a corn binder, showing the adjustably mounted, right-hand gathering board;

Figure 2 is a rear view of the corn binder;

Figure 3 is a detail, sectional view on an enlarged scale through an upper clamp device, taken along the line 3—3 of Figure 1, looking in the direction of the arrows; and, Figure 4 is a detail, sectional view, on an enlarged scale through a lower clamp device, taken along the line 4—4 of Figure 1, looking in the direction of the arrows.

The corn binder embodies the usual axle structure 10, pair of wheels 11, and forwardly extending main frame 12. A draft frame is indicated at 13. The frame 12 at its left-hand side carries a standard 14 for mounting a bracket 15 that carries the left-hand stationary gather board 16. The board 16 carries a bracket 17 for mounting a flare board 18 over the board 16, the boards 16, 18 comprising the left-hand gathering board mechanism, which slopes upwardly and rearwardly, in the usual way, from its front point of connection to the forward end of the frame 12.

The right-hand gathering board is shown at 19, the same carrying brackets 20 for mounting the auxiliary board 21, which in turn carries the flare board 22. The auxiliary board 21 is carried at its upper or rear end on a pipe support 23 connected at 24 to the main frame 12, while the board 19 is additionally supported by a bracket 24' connected to the support 23. The right-hand gathering board parts 19, 21 and 22 constitute a unit which slopes upwardly and rearwardly from the forward point of connection 25 thereof to the main frame 12, as appears in Figure 1.

This pair of gather boards 16, 18, as one unit, and 19, 21 and 22, as the other unit, provide a throat or passage-way 26, through which the row crop passes as the machine moves ahead, there being a knife, not shown, for severing the stalks entering the said passage-way, and chains generally shown at 27 for engaging and holding the cut stalks erect while moving them over a butt pan 28 having a rearward extension 29, where the stalks are bound into bundles by means, not shown, and in the usual way. These chains included in each gathering board unit are driven by upstanding shafts 30, 31 driven by a shaft 32 and gears, as shown, in the usual way, the right-hand shaft 31 including a flexible drive coupling 33 for a purpose later to appear.

The under side of the upper end of the auxiliary board 21, as shown best in Figure 3, carries a depending bracket 34 having formed therein a transverse slot 35. This bracket rests on the goose-neck, upper, transverse extension 36 of the support 23. This extension carries a vertical bolt 37, the head of which is located inside the bracket 34 with its shank extending downwardly through the slot 35 and through bolt holes formed in said extension 36 in an obvious manner. A nut 38 permits the bolt to be tightened or loosened, as desired.

The under side of the board 19 at its upper end carries an angle-bar 39, the upright web of which is formed with a transverse slot 40. Lying against this flange of the bar 39 is a bar or strap 41, that helps support the gathering mechanism from an upright wall 42 adjacent the binding mechanism, not shown. This bar 41 is formed with a transverse slot, as at 43 (see Figure 4). A headed bolt 44 is carried by the brace 24 with its shank passed through the slots 43, 40 to secure the parts 24, 41 and 39 together, a nut 45 being carried on the bolt 44 for this purpose, as shown.

The above clamp bolts 37, 44 described apply only to the mounting of one of the gather board units and, in the present form of the invention, only to the right-hand unit 19, 21. For the handling of normal crops the two gather board units, that is the left-hand one and the right-hand one, are arranged substantially in parallelism, as shown in full lines in Figure 2, with the passage-way 26 being of substantially uniform width throughout. This arrangement is satisfactory when handling normal crops. However, when unusually bushy corn, or soy beans are handled, this passage 26 causes too much crowding and results in the gathering chains raising the butt ends of the stalks upwardly and off the butt pan extension 29, which is highly objectionable, as it interferes with proper binding of the stalks into bundles.

Accordingly, by the subject-matter of the present invention, the right-hand gather board unit at its upper end can be loosened from its mounting points by loosening the bolts 37 and 44, by loosening the respective nuts 38, 45 thereon. With the boards 21, 19 thus loosened at their upper ends, the whole right-hand gather board unit may be sprung laterally a distance equal to the length of the slots 35 and 43, 40 in a direction away from the left-hand unit 16, 18, thus materially increasing the width of the passage 26 at its upper end. Enough flexibility is present in the right-hand unit to permit this springing action, as described. By once more tightening the nuts 38, 45 on the respective bolts, the right-hand unit boards can be securely clamped in their adjusted positions. Thus may be provided in a simple manner a widened stalk passage to accommodate the more bushy crops.

The structure obviously achieves all of the desirable objects heretofore recited. It is the intention to cover all changes and modifications of the illustrative form herein shown and described which do not depart from the spirit and scope of the invention as hereinafter claimed.

What is claimed is:

1. A stalk gathering machine comprising a wheel carried frame, a pair of longitudinally disposed gather board units supported on the frame and extending upwardly and rearwardly from a forward point of connection on the frame to provide between them a longitudinal stalk gathering passage, means supporting the rear ends of said gather board units, and means operatively associated with said last mentioned supporting means for relatively adjusting the boards in a lateral direction to widen the passage between said gather board units.

2. A stalk gathering machine comprising a wheel carried frame, a pair of longitudinally disposed gather board units supported on the frame and extending upwardly and rearwardly from a forward point of connection on the frame to provide between them a longitudinal stalk gathering passage, means supporting the rear end of one of said gather board units, and means operatively associated with said last mentioned supporting means for adjusting the latter board unit in a lateral direction to widen the passage between said gather board units.

3. A stalk gathering machine comprising a wheel carried frame, a pair of longitudinally disposed gather board units supported on the frame and extending upwardly and rearwardly from a forward point of connection on the frame to provide between them a longitudinal stalk gathering passage, and means for relatively adjusting the boards in a lateral direction to widen the passage between said gather board units.

4. A stalk gathering machine comprising a wheel carried frame, a pair of longitudinally disposed gather board units supported on the frame and extending upwardly and rearwardly from a forward point of connection on the frame to provide between them a longitudinal stalk gathering passage, and means for adjusting one board unit in a lateral direction to widen the passage between said gather board units.

5. A stalk gathering machine comprising a wheel carried frame, a pair of longitudinally disposed gather board units supported on the frame and extending upwardly and rearwardly from a forward point of connection on the frame to provide between them a longitudinal stalk gathering passage, means supporting the rear end of one of said gather board units, and means comprising clamping devices fastening the said board unit to said supporting means for adjustably moving the said board unit in a lateral direction to widen the passage between said gather board units.

6. A stalk gathering machine comprising a wheel carried frame, a pair of longitudinally disposed gather board units supported on the frame and extending upwardly and rearwardly from a forward point of connection on the frame to provide between them a longitudinal stalk gathering passage, frame pieces supporting the rear ends of one of said gather board units, and means comprising slotted brackets between the frame pieces and said gather board unit including bolts for adjusting said one of the boards in a lateral direction to widen the passage between said gather board units.

7. A corn binder or the like gather board unit disposed longitudinally on the binder frame and inclined upwardly and rearwardly from a fixed point of connection at the forward end of the frame, a supporting structure carrying the rear end of the unit, a bracket having a transverse slot located between the unit and the supporting structure including a clamp bolt, said bolt adapted to be loosened to permit springing the upper end of the board unit in a lateral direction, said bolt then adapted to be tightened to secure the upper end of the unit in the sprung position.

ANDREW KOWALSKY.